US006309457B1

(12) United States Patent
Guerinet et al.

(10) Patent No.: US 6,309,457 B1
(45) Date of Patent: Oct. 30, 2001

(54) CEMENT-BASED SELF-LEVELING COMPOSITION

(75) Inventors: Jean-Paul Guerinet, Compiegne; Martin Mosquet, Dandonville; Francois Bosc, Dammarie-les-Lys; Jacques Chappuis, Frontonas, all of (FR)

(73) Assignee: Lafarge S.A., Paris (FR)

( * ) Notice: Subject to any disclaimer, the term of this patent is extended or adjusted under 35 U.S.C. 154(b) by 0 days.

(21) Appl. No.: 09/423,604

(22) PCT Filed: May 11, 1998

(86) PCT No.: PCT/FR98/00938

§ 371 Date: Jan. 28, 2000

§ 102(e) Date: Jan. 28, 2000

(87) PCT Pub. No.: WO98/51637

PCT Pub. Date: Nov. 19, 1998

(30) Foreign Application Priority Data

May 12, 1997 (FR) .................................................. 97 06010

(51) Int. Cl.$^7$ ............................ C04B 24/00; C04B 28/02; E04F 15/12
(52) U.S. Cl. ......................... 106/727; 106/725; 106/806; 106/808; 106/823; 524/3; 524/4
(58) Field of Search .................................... 106/727, 808, 106/725, 806, 823; 524/3, 4

(56) References Cited

FOREIGN PATENT DOCUMENTS

2696736 * 4/1994 (FR) .

* cited by examiner

*Primary Examiner*—Anthony Green
(74) *Attorney, Agent, or Firm*—Oblon, Spivak, McClelland, Maier & Neustadt, P.C.

(57) ABSTRACT

The present invention relates to a self-leveling composition for floor toppings, characterized in that it is based on Portland cement or on cement mix CM II or CM III, and in that it further comprises at least sand, water and at least one plasticizer which is a water-soluble or water-dispersible organic compound (I) containing at least one aminodi (alkylenephosphonic) group and at least one polyoxyalkyl chain, or at least one salt of compound (I).

38 Claims, No Drawings

CEMENT-BASED SELF-LEVELING COMPOSITION

DESCRIPTION OF THE BACKGROUND

Well known techniques exist for preparation of cement-based self-leveling compositions containing mineral aggregates, organic additives, one being a plasticizer, and water. The great advantage of self-leveling compositions normally lies in the ease and rapidity of use, since leveling of such compositions with a straightedge or equivalent means is facilitated or unnecessary.

Thus, there are known:

cement-based self-leveling compositions containing, as plasticizer, for example, a formaldehyde melamine, a melamine derivative or a sulfonated naphthalene. In general, however, because their fluidity exists only for a limited time, such compositions must be placed on the site rapidly after preparation thereof (see, for example, German Utility Model DE 29518306). Methods exist for maintaining the fluidity of such compositions during time, either by adding the plasticizer at timed intervals or by incorporating more plasticizer or by increasing the quantity of mixing water, but for economic and/or technical reasons they are not satisfactory;

cement-based self-leveling compositions containing a special plasticizer which makes it possible to maintain fluidity over time. This may be a plasticizer based on carboxylated vinyl monomers: see, for example, European Patent Applications No. 0725044 and 0753489, wherein the fluidity is maintained for at least 6 hours. The main disadvantage of the compositions described in these two patent applications is one of long setting times. This makes it difficult or even impossible on the following day for persons to walk on toppings manufactured with these compositions for the purpose, for example, of finishing tasks.

The plasticizers known heretofore in the field of self-leveling toppings can be generally classified into four major families:

lignosulfonates;

plasticizers of the polynaphthalenesulfonate type;

plasticizers of the polymelaminesulfonate type;

plasticizers based on carboxylated vinyl monomers and possibly on sulfonated vinyl monomers.

As indicated hereinabove, plasticizers based on carboxylated vinyl monomers are currently preferred, because they lead to maintenance of fluidity over time, although such maintenance of fluidity is often achieved at the expense of short-term strength.

SUMMARY OF THE INVENTION

Surprisingly, there has been discovered a cement-based self-leveling composition which contains, as a plasticizer, an organic compound that does not belong to the aforesaid four plasticizer families: this organic compound is water-soluble or water-dispersible, and contains at least one aminodi (alkylenephosphonic) groups, which may or may not be in salt form, and at least one polyoxyalkyl chain. In addition, the self-leveling composition containing this organic compound has the following decisive advantages:

1) the composition can be prepared in a standard central concrete depot, without modification of such concrete depot, and be delivered ready for use on the site by transit mixers. If necessary, the fluidity of the composition is adjusted by supplementary addition of plasticizer and/or water on the site. In this way homogeneity of the mix is favored;

2) the fluidity of the composition eliminates the traditional operations of spreading, vibrating, leveling with a straightedge or equivalent means, as well as the operation of floating, provided the normal conditions of use are respected by the person skilled in the art. To obtain a flat and smooth surface, it is sufficient to pass a finishing bar and/or a broom over the surface of the fresh product. In addition, the maintenance of this fluidity for a period of time sufficient to place the material (on the order of 2 to 4 hours) and the good kinetics of setting and hardening of the composition permit access of persons on the topping on the day following placement of the composition;

3) the composition, with which a topping can be rapidly completed, makes it possible to achieve great daily productivity, of at least 800 $m^2$ per day, with a crew of two or three topping workers.

DETAILED DESCRIPTION OF THE PREFERRED EMBODIMENTS

More precisely, the self-leveling composition according to the invention for floor toppings, which composition achieves the aforesaid advantages 1) to 3), is characterized in that it is based on Portland cement (CM I) or on cement mix CM II or CM III (according to Draft European Standard prEN 197-1 of October 1997), and in that it further contains at least sand, water, at least one plasticizer (I) which is a water-soluble or water-dispersible organic compound (I)containing at least one aminodi (alkylenephosphonic) group and at least one salt of compound (I), the compound (I) having the formula:

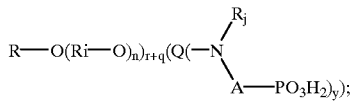

More precisely, the self-leveling composition according to the invention for floor toppings, which composition achieves the aforesaid advantages 1) to 3), is characterized in that it is based on Portland cement (CM I) or on cement mix CM II or CM III (according to Draft European Standard prEN 197-1 of October 1997), and in that it further comprises at least sand, water, at least one plasticizer (I) which is a water-soluble or water-dispersible organic compound (I) containing at least one aminodi(alkylenephosphonic) group and at least one polyoxyalkyl chain, or at least one salt of compound (I), the said compound (I) having the formula:

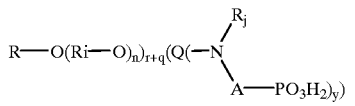

in which:

R is a hydrogen atom or a monovalent hydrocarbon group, which may or may not be saturated, containing from 1 to 18 (inclusive) carbon atoms and possibly one or more hetero atoms: preferably R is a hydrogen atom or a monovalent hydrocarbon group, which may or may not be saturated, containing from 1 to 4 carbon atoms;

50% to 100% of the Ri are ethylene, 0 to 50% of the Ri are propylene and 0 to 5% of any other Ri are similar to or different from each other and represent an alkylene such as butylene, amylene, octylene or cyclohexene, or an arylene such as styrene or methylstyrene; these Ri may or may not include one or more hetero atoms;

Q is a hydrocarbon group containing from 2 to 18 (inclusive) carbon atoms and possibly one or more hetero atoms; preferably Q is a hydrocarbon group containing from 2 to 12 (inclusive) carbon atoms, more preferably from 2 to 6 (inclusive) carbon atoms, and even better it represents ethylene or propylene;

A is an alkylidene group containing from 1 to 3 (inclusive) carbon atoms: preferably A represents the methylene group;

the Rj are similar to or different from each other and can be chosen from among:
the A—PO3H2 group, wherein A has the meaning indicated hereinabove,
and the group

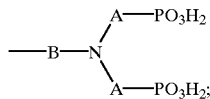

in which B denotes an alkylene group containing from 2 to 8 (inclusive) carbon atoms: preferably B represents ethylene or propylene and A has the meaning indicated hereinabove;

"n" is an integral number between 20 and 250, terminal groups included;

"r" is the number of [R—O(Ri—O)n] groups carried by the assembly of the Rj,

"q" is the number of [R—O(Ri—O)n] groups carried by Q, the sum "r+q" is at most equal to 3;

"y" is an integral number equal to 1 or 2.

A detailed description of compounds (I) and of the process for preparation thereof is given in European Patent No. 0663892.

In the context of the present invention, the term self-leveling composition means a composition having a fluidity just before pouring of the floor topping such that, after filling of a reference cone (minor diameter 55 mm, major diameter at the bottom 95 mm, height 70 mm) then withdrawal of the reference cone, the resulting circular free spreading has a diameter at least equal to 15 cm, preferably at least equal to 17 cm, and even better on the order of 23 cm±3 cm.

Advantageously, compound (I) used as plasticizer in the self-leveling composition according to the invention has one or more of the following characteristics:

1—at least 50% of the Ri are ethylene and any other $R_i$ are propylene;
2—$R_j$ is chosen from among the —CH$_2$—PO$_3$H$_2$, —C$_2$H$_4$N(CH$_2$—PO$_3$H$_2$)$_2$ and —C$_3$H$_6$N(CH$_2$—PO$_3$H$_2$)$_2$ groups, which may or may not be in salt form;
3—"n" is between 30 and 150 (terminal groups included), and even better between 50 and 100 (terminal groups included);
4—"r+q" is equal to 1;
5—"y" is equal to 1.

Very good results have been achieved with a diphosphonate compound (I) in which $R_i$ is ethylene, $R_j$ is —CH$_2$—PO$_3$H$_2$, n is between 30 and 150 (terminal groups included), preferably between 50 and 100 (terminal groups included), "r+q" is equal to 1 and "y" is equal to 1, such as compound (I) of formula (II):

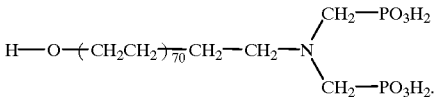

Advantageously, the quantity of plasticizer (I) containing at least one aminodi(alkylenephosphonic) group and at least one polyoxyalkyl chain in the self-leveling composition ranges between 0.2 and 2% by dry weight relative to the weight of cement, preferably between 0.3 and 0.8% by dry weight.

The grain sizes of the sand used in the self-leveling composition according to the invention can vary between 0 and 10 mm, preferably between 0 and 5 mm.

According to one alternative embodiment of the self-leveling composition according to the invention, there is provided in the self-leveling composition, in addition to plasticizer (I) with the aforesaid formula (I), at least one water-soluble or water-dispersible plasticizer (PCP), which is of polycarboxylic acid type and contains polyether chains. These plasticizers (PCP), which are based on carboxylic vinyl monomers and possibly on sulfonated monomers, are well known and are described in particular in U.S. Pat. No. 5,614,017 and European Patent EP 0612702. The ratio of weight of plasticizer (I) to plasticizer (PCP) is preferably varied from 0.1 to 10. The combination of plasticizers (I) and (PCP) makes it possible to prepare cement-based self-leveling compositions having the desired fluidity at lower water contents. In addition, by varying the proportion of plasticizer (I) to plasticizer (PCP), it is possible to adjust the time of maintenance of fluidity of the cement-based self-leveling compositions, especially self-leveling compositions based on cement mix CM II or CM III (according to European Standard prEN 197-1). The plasticizer (PCP) provided in the self-leveling composition according to the invention preferably contains polyether chains of different lengths. The plasticizer (PCP) provided in the self-leveling composition according to the invention is preferably such that the polyether chains contain on average at least 50% oxyethylene units [percentage expressed relative to the total oxyalkylene units of the plasticizer (PCP)]. More preferably, the other oxyalkylene units are oxypropylene units.

Advantageously the self-leveling composition according to the invention comprises at least one anti-foaming agent. The chemical nature of the anti-foaming agent is not critical. Preferably tributyl phosphate will be chosen. The quantity of anti-foaming agent is generally between 0.001% and 0.3% by weight relative to the weight of cement.

Advantageously the self-leveling composition according to the invention comprises at least one thickening agent. As thickening agent that can be used in the self-leveling composition which is the object of the present invention there can be cited mineral compounds such as sepiolite or ultrafine silicas, or organic compounds such as derivatives of cellulose or high molecular weight polysaccharides, such as xanthan gums, or mixtures of two or more of the aforesaid thickening agents. The quantity of thickening agent can be between 0.005% and 0.05% by dry weight relative to the weight of cement.

Advantageously there are provided fine mineral aggregates in the self-leveling composition according to the invention: these generally have dimensions not exceeding 200 microns. As examples of fine mineral aggregates appropriate to the invention there can be cited fly ashes, lime fillers, silica flour, meta kaolin, ground slags or a mixture of at least two of the foregoing. According to a preferred embodiment, the self-leveling composition according to the invention comprises at least 500 kg per m$^3$ of fine particles of dimensions preferably not exceeding 100 microns, these particles being constituted substantially of fine mineral aggregates and of cement. In fact, under these conditions, the following additional advantages have been achieved: once the self-leveling composition according to the invention has been placed, it exhibits hardly any or even zero phenomena of segregation of the mineral aggregates and of bleeding, nor does it exhibit any ascent of fine particles or of bubbles to the surface, provided the normal working conditions well known to the person skilled in the art are respected (such as, in the case of manufacture of an adherent topping, correctly treating the support concrete before placing the composition, either by wetting it with water or applying an adherence primer). Once the self-leveling composition according to the invention has hardened, it leads to a topping exhibiting a surface of good appearance, which is smooth and flat, without the need for sanding. Depending on application, the self-leveling composition according to the invention may also comprise at least one of the following compounds: an organic polymer, synthetic, mineral or metal fibers, an accelerator, a retarder, a shrinkage reducer, an air-entraining agent, a waterproofer, etc. When an anti-foaming agent and if appropriate a thickening agent are provided in the self-leveling composition according to the invention, it is advantageous to introduce them simultaneously with the plasticizer (I) into this composition, by means of a uniform and stable premix. Preferably this premix contains substantially:

water;

at least one anti-foaming agent which is non-water-soluble or scarcely water-soluble;

at least one plasticizer (I) of formula (I) and if appropriate another plasticizer such as a water-soluble or water-dispersible plasticizer (PCP);

at least one organic compound (O) containing:

at least one primary, secondary or tertiary amine function, which may be partly or totally neutralized by a Brönstedt organic or inorganic acid;

and at least one linear or branched, saturated or unsaturated alkyl or alkylaryl chain comprising at least 8 carbon atoms, and possibly also hetero atoms, chosen from among oxygen, sulfur and nitrogen;

at least one mineral stabilizer when the pH of the said premix is higher than 7, such as the clays and the sepiolites;

if appropriate, an acid or a base to adjust the pH of the said premix.

In this premix:

the term "non-water-soluble or scarcely water-soluble anti-foaming agent" means an anti-foaming agent that is scarcely soluble or insoluble in aqueous media at ambient temperature (about 20° C.) and atmospheric pressure;

the term "uniform mix" means a mix which, left to stand, can transform from a clear mix (such as a microemulsion) to a turbid mix (such as an oil-in-water emulsion). Sometimes a fine film, generally of foam, may be present on the surface of the uniform mix.

The organic compound (O) is preferably chosen from among oleic acid amine, coconut fatty acid amine, tallow fatty acid amine and derivatives of these amines, especially the derivatives of those amines containing an oxyethylene unit or a chain containing at most 8 oxyethylene units.

According to a first special embodiment of the invention, the self-leveling composition comprises:

(a) 200 to 500 kg/m$^3$ of Portland cement;

(b) 0 to 400 kg/m$^3$ of fine mineral aggregates;

(c) 900 to 1900 kg/m$^3$ of sand with maximum grain size smaller than or equal to 10 mm, preferably smaller than or equal to 5 mm;

(d) water, in a water-to-cement ratio (W/C) greater than or equal to 0.4;

(e) at least one anti-foaming agent;

(f) at least one thickening agent;

(g) at least one compound (I) as plasticizer, in a proportion of 0.2 to 2% by dry weight relative to the weight of cement, and possibly at least one plasticizer (PCP).

According to a second special embodiment of the invention, the self-leveling composition comprises:

(a) 200 to 400 kg/m$^3$ of Portland cement;

(b) 100 to 400 kg/m$^3$ of fine mineral aggregates;

(c) 1100 to 1600 kg/m$^3$ of sand with maximum grain size smaller than 10 mm, preferably smaller than or equal to 5 mm;

(d) water, in a water-to-cement ratio (W/C) of between 0.6 and 1.2;

(e) at least one anti-foaming agent;

(f) at least one thickening agent;

(g) at least one compound (I) as plasticizer, in a proportion of 0.2 to 2% by dry weight relative to the weight of cement, and possibly at least one plasticizer (PCP).

In both aforesaid embodiments of the invention, constituents (e) and (g) and possibly constituent (f) may be introduced simultaneously, by means of the premix described hereinabove.

The invention also relates to a floor topping characterized in that it is manufactured from a self-leveling composition as defined hereinabove.

Such a floor topping may be provided additionally on its upper surface with a film of curing product deposited, for example, by spraying or any other adequate means. The invention also relates to a process for manufacture of a floor topping, characterized by the following stages:

preparation of a mix of a self-leveling composition, such as defined in the foregoing description;

transportation if necessary of the said mix in a transit mixer to the site of the floor topping;

preparation of the new or restored topping support in conformity with the engineering codes in force in the country under consideration. In France, for example, these codes can be found in the pertinent unified technical documents (D.T.U.), in particular D.T.U. 26-2, D.T.U. 65-7 and D.T.U. 65-8, and in the technical specifications in force;

if necessary, adjustment of the rheology of the mix by means of a supplementary addition of the plasticizer defined hereinabove, or of water;

pumping and pouring of the said mix onto the support and passage of the finishing bar over the surface.

The self-leveling composition according to the invention may be prepared either by mixing on site or in the central concrete depot, or by premixing of all or part of its constituents in a premix manufacturing unit, these intermediate compositions or premixes ultimately being mixed with water and, if necessary, with additional constituents.

As indicated hereinabove, the fluidity of the mix before the pouring operation is such that, when a specimen of this mix is poured into a reference cone (minor diameter 55 mm, major diameter at the bottom 95 mm, height 70 mm) and then the cone filled with mix is removed, there is obtained circular free spreading to a diameter at least equal to 15 cm, preferably at least equal to 17 cm, and even better on the order of 23 cm±3 cm.

In addition to the advantages recited hereinabove, the self-leveling composition according to the invention leads to clearly improved flatness under the 2-meter straightedge (according to D.T.U. 26-2 of September 1982). This flatness is generally better than 1 mm under the 2-meter straightedge.

The invention will now be described with reference to an illustrative and non-limitative example of the invention.

EXAMPLE 1

Manufacture of a 60-m² Adherent Floor Covering on an Old Concrete Support

The entire surface of the old concrete is cleaned and then suctioned in order to eliminate any nonadhering part. An adherence primer is then spread in one layer with a weight of 200 g/m². This primer comprises an aqueous dispersion of vinyl copolymers. This primer is left to dry for two hours.

The self-leveling composition used is a readymix composition manufactured in a central concrete depot in two batches of 2 m³ each. The formula of the self-leveling composition is as follows (in dry kg per m3):

Portland cement (CEM1 52.5 according to French Standard NF P15-301 of 1994): 350 fly ash: 250 finest sand (from 0 to 1 mm): 200 sand (from 0 to 5 mm): 1105 plasticizer [diphosphonated and polyoxyethylated compound (I) of formula (II) described hereinabove]: 1.5 thickener, a xanthan gum: 0.045 anti-foaming agent: a tributyl phosphate: 0.4 water: 240 liters

This self-leveling composition is delivered in a standard transit mixer. A fluid topping of 5 cm thickness is poured. The fluidity, measured in cm of spread at the reference cone, is equal to 25 cm at the moment of pouring and after a waiting time of 2 hours after manufacture of the composition in the central concrete depot. This fluidity is retained during the operation of pouring of the topping, which lasts for about 30 minutes. The density of the self-leveling composition is equal to 2.15, and the quantity of air occluded is equal to 1.8% (by volume).

This self-leveling composition retains sufficient fluidity (23 cm±3 cm at the reference cone) until 4 hours after mixing with water, and has suitable workability, so that a crew of two or three topping workers can use a standard mortar pump to cover a surface area of 1000 m² per day without excessive fatigue.

Before pouring the topping:
 the singular points (projecting corners and bottoms of doors) are treated with a glass reinforcement sold under the name WG 210G by the CHOMARAT Co. (An anti-cracking trellis or any other screen of metal or vegetable material can be used instead of this glass reinforcement);
 the vertical walls are separated from the poured topping by a foam-rubber strip with a thickness of 0.5 cm.

Surface finishing of the topping is performed by means of a metal bar (or finishing bar), by passing this bar over the surface, or possibly by means of a broom, while the composition is still fluid.

The performances of the hardened topping are equal or even superior to those of cement-based toppings manufactured and placed in the traditional way. For example, the mechanical performances in compression (Rc) and in flexion (Rf) are:

|  | 2 days | 7 days | 28 days |
|---|---|---|---|
| Rc (MPa) | 14.9 | 26.3 | 32 |
| Rf (MPa) | 4 | 5.9 | 7 |

The flatness under the 2-meter straightedge, according to D.T.U. 26-2 of September 1982, is better than 1 mm. In addition:
 no segregation or bleeding phenomenon was observed;
 no phenomenon of ascent of fine particles or of bubbles to the surface was observed;
 the surface of the hardened topping is smooth, flat and hard, without surface film. This allows the majority of floor coatings to be placed directly without preliminary preparation;
 the setting and hardening kinetics are fast: the topping is accessible for finishing tasks on the day after placement thereof;
 the aforementioned self-leveling composition is also suitable for manufacture of a non-adherent topping (separated or floating on an insulating layer) or a heating topping containing a floor heating system.

EXAMPLE 2

Manufacture of a 33-m² Floor Topping of Average Thickness Equal to 7 to 8 mm, Separated and Without Reinforcement, on a Plastic Film Placed on an Old Concrete Support The old topping was broken. On the floor cleared of debris from the broken old topping there is placed a plastic film.

The self-leveling composition used is a readymix composition manufactured in a central concrete depot in two batches of 1.5 m³ each. The formula of the self-leveling composition is as follows (in dry kg per m³):

Portland cement (CEM 1 52.5) from Cormeilles: 230;

fly ash: 370 finest sand (from 0 to 0.4 mm): 220 sand (from 0 to 5 mm): 1065 premix (a) containing diphosphonated and polyoxyethylated compound (I) of formula (II) described hereinabove, with a content of dry extract equal to 40%: 4.5 wet kg per m³ of the self-leveling composition;

polypropylene fibers with mean length of 15 mm: 1;

water: 260 liters.

Premix (a) has the following composition (in % by weight):

compound (I) of formula (II): 41%;

tributyl phosphate: 6.3%;

oleic acid amine containing 2 moles of ethylene oxide, sold under the name NORAMOX O2 by the CECA Co.: 3%;

sepiolite sold under the name PANGEL 59 by the COMPTOIR DES MINERAUX ET MATIERES PREMIERES Co. (C.M.M.P.): 1.3%;

water: 37.9%;

diethanolamine (in 30% solution): 10.5%.

This self-leveling composition is delivered in a standard transit mixer. Under shelter, a fluid topping of 7 to 8 cm thickness is poured. The fluidity, measured in cm of spread at the reference cone, is equal to 23 cm at the moment of pouring and after a waiting time of 1 hour after manufacture of the composition in the central concrete depot. This fluidity is retained during the operation of pouring of the topping, which lasts for about 20 minutes. The conditions at the moment of pouring were an ambient temperature of 13° C. and a relative humidity of close to 80% (the weather was rainy). This self-leveling composition exhibits excellent fluidity, very good pumpability and suitable workability, so that a crew of two or three topping workers can use a standard mortar pump to cover a surface area of 1000 m² per day without excessive fatigue.

Surface finishing of the topping is easy and is performed by means of a metal bar (or finishing bar), by passing this bar over the surface. Passes with the finishing broom while the composition is still fluid further improve the surface condition. It must be pointed out that the self-leveling of this topping resembles that of the fluid topping of anhydrite that is renowned for this property.

The performances of the hardened topping are equal or even superior to those of cement-based toppings manufactured and placed in the traditional way. For example, the mechanical performances in compression (Rc) and in flexion (Rf) are:

|  | 7 days | 28 days |
|---|---|---|
| Rc (Mpa) | 16.3 | 25.5 |
| Rf (MPa) | 4.22 | 6.2 |

The flatness under the 2-meter straightedge, according to D.T.U. 26-2 of September 1982, is better than 2 mm. In addition:

no segregation or bleeding phenomenon was observed;

no phenomenon of ascent of fine particles or of bubbles to the surface was observed;

the surface of the hardened topping is smooth, flat and hard, without surface film. This allows the majority of floor coatings, in the present case sealed tiling, to be placed directly without preliminary preparation;

the setting and hardening kinetics are fast: it is possible to walk cautiously on the topping on the day after placement thereof, 18 hours after pouring;

four months after completion of the topping, no blemishes were observed: no cracking, good surface hardness, surface flatness better than 2 mm under the 2-m straightedge.

EXAMPLE 3

Manufacture of a 280-m² Floor Topping in a Heating Floor, in a First Story

Preparation of the Site (Unheated, but Enclosed)

The floor heating system using warm water at low temperature comprises tubes embedded in polystyrene plates with attached studs. A 50×50 cm anti-cracking metal trellis is then installed together with edge strips permitting the topping to be separated from the vertical walls. The vertical walls are separated from the poured topping by a foam-rubber strip with a thickness of 0.5 cm.

The self-leveling composition used is a readymix composition manufactured in a central concrete depot in three batches of 5.25 m³, 5.25 m³ and 3.75 m³. The formula of the self-leveling composition is as follows (in dry kg per m3):

Portland cement (CEM1 52.5) from Cormeilles: 230;

fly ash: 370 sand (from 0 to 5 mm): 1285;

premix (a) described in Example 2: 4.5 wet kg per m³ of the self-leveling composition;

polypropylene fibers with mean length of 15 mm: 1;

water: 274 liters.

A fluid topping of 6 cm thickness, of which 3 cm is above the studs, is poured. The fluidity, measured in cm of spread at the reference cone, is equal to 22 cm at the moment of pouring and after a waiting time and transportation of 1 hour after manufacture of the composition in the central concrete depot. Thus there is no difficulty in reaching the 5 m of the second story. This fluidity is retained during the operation of pouring of the topping, which lasts for about 1 hour per batch, the density of the self-leveling composition is equal to 2.1 and the quantity of air occluded is equal to 2%.

Surface finishing of the topping is performed by two crosswise passes of a metal bar (or finishing bar), by passing this bar over the surface and passing a broom, while the composition is still fluid.

The performances of the hardened topping are equal or even superior to those of cement-based toppings manufactured and placed in the traditional way. For example, the mechanical performances in compression (Rc) and in flexion (Rf) are:

|  | 1 days | 7 days |
|---|---|---|
| Rc (MPa) | 3.4 | 17.9 |
| Rf (MPa) | 1.4 | 4.6 |

The flatness under the 2-meter straightedge of the topping obtained under the conditions of D.T.U. 26-2 of September 1982 is on the order of mm, or clearly better than the limit value of 5 mm specified by this D.T.U. 26-2.

In addition:

no segregation or bleeding phenomenon was observed;

no phenomenon of ascent of fine particles or of bubbles to the surface was observed;

the surface of the hardened topping is smooth, flat and hard, without surface film. This allows the majority of floor coatings, in the present case sealed tiling, to be placed directly without preliminary preparation;

the setting and hardening kinetics are fast: it is possible to walk on the topping on the very next day. The topping can withstand all trade equipment 2 days thereafter;

no cracking after 2 months.

EXAMPLE 4

Manufacture, in a Central Concrete Depot, of a Fluid Mortar Intended to be Poured as a Separated Topping on Plastic Film on an Old Concrete Slab in an Average Thickness of 4 cm The self-leveling composition used is a readymix composition manufactured in a central concrete depot by mixing with water in one batch of 0.750 m³. The formula of the self-leveling composition is as follows (in dry kg per m³)

| | |
|---|---|
| Portland cement CEM II 32.5 from Val d'Azergues: | 400 |
| lime filler: | 100 |
| sand from 0 to 4 mm: | 1385 |
| polypropylene fibers with mean length of 15 mm: | 0.8 |
| water: | 246 liters. |

This self-leveling composition also comprises a plasticizing additive containing the diphosphonated and polyoxyethylated compound of formula (II) described hereinabove, with a content of dry extract equal to 30% and a PCP plasticizer of polycarboxylic acid type containing polyether chains: 4.5 wet kg per m³ of the self-leveling composition.

Preparation of PCP Plasticizer by Partial Esterification of a Polyacrylic Acid with a Methyl Ether of Monofunctional Polyethylene Glycol The raw materials used are the following:
120 g of poly (meth) acrylic acid sold by BASF under the name Sokalan CP10S. Its weight-average molecular weight is equal to 4000 daltons. It is diluted to 50% in water;
252 g of a methyl ether of polyethylene glycol (type M750 of Hoechst) with weight-average molecular weight equal to 750 daltons;
0.60 g of lithium hydroxide.

In an enameled reactor equipped with a stirrer, a distillation device and a system for application of partial vacuum, there are introduced the aforesaid raw materials in the following order:
poly(meth)acrylic acid;
lithium hydroxide;
methyl ether of polyethylene glycol (liquid product at 50° C.).

As soon as introduction of the methyl ether of polyethylene glycol is complete, the reactor is subjected to partial vacuum (20 to 30 mm Hg) under nitrogen cover gas. It is then heated to about 60 to 75° C.: distillation begins with entrainment of water by poly(meth)acrylic acid. The temperature is then raised to about 165 to 175° C. to bring about esterification. The water formed is removed during the esterification reaction. After 6 hours at about 165 to 175° C., the degree of completion of the reaction is checked by analysis of the acid index and a liquid-phase gel-permeation chromatographic test (GPC) calibrated with polyethylene glycol (PEG).

The target acid index for the end of reaction is equal to 56 mg KOH/g (which corresponds to esterification of 40% of the carboxylic functions of the starting poly(meth)acrylic acid). At the end of reaction, the reactor is cooled to a temperature on the order of 80° C., after which the plasticizing additive is prepared as follows: to the reaction mixture there is added diphosphonated and polyoxyalkylated compound (I) of formula (II), oleic acid amine with 2 moles of ethylene oxide (sold under the name Noramox 02 by C.E.C.A.), tributyl phosphate (anti-foaming agent) and sepiolite. Finally, the product is diluted with water and diethanolamine is added. The plasticizing additive prepared in this way is ready for use. Its composition is as follows (in per cent by weight):
diphosphonated and polyoxyalkylated compound (I) of formula II: 30
pCP plasticizer containing 30% of dry extract: 8
tributyl phosphate: 3
oleic acid amine sold commercially as NORAMOX 02: 3
sepiolite sold commercially as PANGEL S9: 1.6
water: 45.9
diethanolamine: 8.5.

This self-leveling composition is delivered in a standard transit mixer with useful volume of 6 m³. This fluid mortar is poured directly on the site of the depot. The fluidity, measured in cm of spread at the reference cone, is equal to 21 cm at the moment of pouring, after a waiting time of 1 hour after manufacture. This fluidity is retained during the operation of pouring of the topping, which lasts for about 15 minutes. The conditions at the moment of pouring were 15° C. and a relative humidity of close to 70%.

This self-leveling composition exhibits excellent fluidity and suitable workability, permitting easy placement.

Surface finishing is performed easily by passing the metal bar over the surface. Passage of the finishing broom further improves the surface condition.

The mechanical performances of this topping in compression and inflexion are very good and are summarized hereinbelow:

| | 1 days | 7 days | 28 days |
|---|---|---|---|
| Rc (MPa) | 4.2 | 25.6 | 34.6 |
| Rf (MPa) | 1.5 | 5.6 | 6.7 |

The flatness under the 2-meter straightedge is better than 2 mm. No segregation or bleeding phenomenon was observed. The surface of the hardened topping is smooth, flat and hard. The topping is practicable as soon as the very day after pouring, and without additional preparation can receive a coating of sealed tiling.

What is claimed is:
1. A self-leveling composition, comprising Portland cement (CEM I) or composite cement (CEM II or CEM III), sand, water, at least one plasticizer (I) and at least fine mineral aggregates having dimensions not exceeding 200 μm, wherein:
   a) a quantity of fine particles of dimensions not exceeding 100 μm present in the self-leveling composition, from cement and fine mineral aggregates, is at least equal to or greater than 500 kg per m³ of said composition;
   b) a water-to-cement ratio (W/C) is equal to or greater than 0.6;
   c) the plasticizer (I) is a water-soluble or water-dispersible organic compound containing at least one aminodi(alkylenephosphonic) group and at least one polyoxyalkyl chain, or at least one salt of the compound, the compound having the following formula:

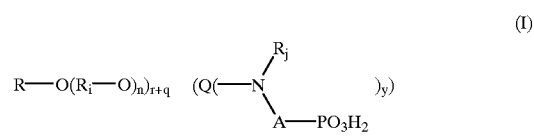

(I)

wherein:
   R is a hydrogen atom or a monovalent hydrocarbon group, containing from 1 to 18 carbon atoms and optionally one or more hetero atoms;
   50% to 100% of the groups $R_i$ are ethylene, 0 to 50% of the groups $R_i$ are propylene and 0 to 5% of any other groups $R_i$ are the same or different from each other and represent an alkylene selected from the group containing butylene, amylene, octylene or arylene, said arylene being selected from the group containing styrene or methylstyrene; the groups $R_i$ optionally containing one or more hetero atoms;

Q is a hydrocarbon group containing from 2 to 18 carbon atoms and optionally one or more hetero atoms;

A is an alkylidene group containing from 1 to 3 carbon atoms;

the groups $R_j$ are the same or different from each other and are selected from the group consisting of i) the group $A\text{—}PO_3H_2$, wherein A is as defined above;

ii) and the group

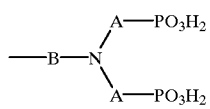

wherein B is an alkylene group containing from 2 to 8 carbon atoms, and A is as defined above;

n is an integral number between 20 and 250;

r is a number of $(R\text{—}O(Ri\text{—}O)_n)$ groups carried by $R_j$;

q is a number of $(R\text{—}O(Ri\text{—}O)_n)$ groups carried by Q;

the sum r+q is at most equal to 3; and y is an integral number equal to 1 or 2;

and wherein fluidity of the self-leveling composition before pouring is such that, when a sample of the composition is poured into a reference cone having a minor diameter of 55 mm, a major diameter at the bottom of 95 mm, a height of 70 mm, and then the filled cone is removed, a circular free spreading is obtained to a diameter of at least 15 cm.

2. The self-leveling composition of claim 1, wherein the group R of the plasticizer (I) is a hydrogen atom or a monovalent hydrocarbon group, which is saturated or unsaturated, containing from 1 to 4 carbon atoms.

3. The self-leveling composition of claim 1, wherein at least 50% of the groups $R_i$ of the plasticizer (I) are ethylene and remaining groups other $R_i$ are propylene.

4. The self-leveling composition of claim 1, wherein the hydrocarbon group Q of the plasticizer (I) contains from 2 to 12 carbon atoms.

5. The self-leveling composition of claim 4, wherein the hydrocarbon group Q of the plasticizer (I) contains from 2 to 6 carbon atoms.

6. The self-leveling composition of claim 5, wherein the hydrocarbon group Q of the plasticizer (I) is ethylene or propylene.

7. The self-leveling composition of claim 1, wherein the groups Rj of the plasticizer (I) are selected from the group consisting of $\text{—}CH_2\text{—}PO_3H_2$, $C_2H_4N(CH_2\text{—}PO_3H_2)_2$ and $\text{—}C_2H_4N(CH_2\text{—}PO_3H_2)_2$ groups, which are optionally in salt form.

8. The self-leveling composition of claim 1, wherein n in the formula for the plasticizer (I) is between 30 and 150 with terminal groups included.

9. The self-leveling composition of claim 8, wherein n in the formula for the plasticizer (I) is between 50 and 100 with terminal groups included.

10. The self-leveling composition of claim 1, wherein the sum of (r+q) in the formula for the plasticizer (I) is equal to 1.

11. The self-leveling composition of claim 1, wherein y in the formula for the plasticizer (I) is equal to 1.

12. The self-leveling composition of claim 1, wherein the formula of the plasticizer (I) is such that $R_i$ is ethylene, $R_j$ is $\text{—}CH_2\text{—}PO_3H_2$, n is between 30 and 150 with terminal groups included, (r+q) is equal to 1 and y is equal to 1.

13. The self-leveling composition of claim 12, wherein n is between 50 and 100 with terminal groups included.

14. The self-leveling composition of claim 12, wherein compound (I), which is optionally in salt form, has the formula (II):

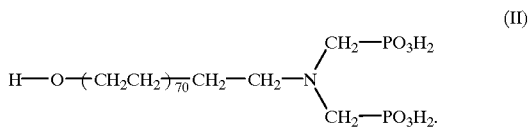

15. The self-leveling composition of claim 1, which comprises a quantity of compound (I) of between 0.2 and 2% by dry weight relative to the weight of cement.

16. The self-leveling composition of claim 1, which further comprises at least one thickening agent.

17. The self-leveling composition of claim 15, which comprises a quantity of between 0.3 and 0.8% by dry weight of said compound (I).

18. The self-leveling composition of claim 1, which further comprises a water-soluble or water-dispersible plasticizer, which is based on carboxylated vinyl monomers or on sulfonated vinyl monomers, and which contains polyether chains.

19. The self-leveling composition of claim 1, which further comprises at least one anti-foaming agent.

20. The self-leveling composition of claim 1, which comprises:

i) 200 to 500 kg/m³ of Portland cement;

ii) 0 to 400 kg/m³ of fine mineral aggregates;

iii) 900 to 1900 kg/m³ of sand with a maximum grain size smaller than or equal to 10 mm;

iv) water;

v) at least one anti-foaming agent;

vi) at least one thickening agent; and vii) at least one compound (I) as plasticizer, in a proportion of 0.2 to 2% by dry weight relative to the weight of cement.

21. The self-leveling composition of claim 20, wherein said (iii) has a maximum grain size smaller than or equal of 5 mm.

22. The self-leveling composition of claim 19, which comprises:

i) 200 to 400 kg /m³ of Portland cement;

ii) 100 to 400 kg/m³ of fine mineral aggregates;

iii) 1100 to 1600 kg/m³ of sand with maximum grain size smaller than 10 mm;

iv) water, in a water-to-cement ratio (W/C) of between 0.6 and 1.2;

v) at least one anti-foaming agent;

vi) at least one thickening agent; and vii) at least one compound (I) as plasticizer, in a proportion of 0.2 to 2% by dry weight relative to the weight of cement.

23. The self-leveling composition of claim 20, which further comprises at least one plasticizer.

24. The self-leveling composition of claim 23, wherein said sand (iii) has a maximum grain size smaller than or equal to 5 mm.

25. The self-leveling composition of claim 22, which further comprises at least one plasticizer.

26. The self-leveling composition of claim 11, wherein fluidity of the self-leveling composition before the pouring operation is such that the circular free spreading obtained with the reference cone has a diameter at least equal to 17 cm.

27. The self-leveling composition of claim 26, wherein fluidity of the self-leveling composition before the pouring operation is such that the circular free spreading obtained with the reference cone is on the order of 23±3 cm.

28. The self-leveling composition of claim 1, having a density of 2.1.

29. A fluid floor screed manufactured from a self-leveling composition, which comprises:

a) a self-leveling composition which has been poured onto a support, said self-leveling composition, comprising:

Portland cement (CEM I) or composite cement (CEM II or CEM III), sand, water, at least one plasticizer (I) and at least fine mineral aggregates having dimensions not exceeding 200 μm, wherein:

a) a quantity of fine particles of dimensions not exceeding 100 μm present in the self-leveling composition, from cement and fine mineral aggregates, is at least equal or greater than 500 kg per m³ of said composition;

b) a water-to-cement ratio (W/C) is equal or greater than 0.6;

c) the plasticizer (I) is a water-soluble or water-dispersible organic compound containing at least one aminodi(alkylenephosphonic) group and at least one polyoxyalkyl chain, or at least one salt of the compound, the compound having the following formula:

$$R\text{---}O(R_i\text{---}O)_n)_{r+q} \quad (Q(\text{---}N\begin{smallmatrix}R_j\\ \\A\text{---}PO_3H_2\end{smallmatrix})_y) \tag{I}$$

wherein:

R is a hydrogen atom or a monovalent hydrocarbon group, containing from 1 to 18 carbon atoms and optionally one or more hetero atoms;

50% to 100% of the groups $R_i$ are ethylene, 0 to 50% of the groups $R_i$ are propylene and 0 to 5% of any other groups $R_i$ are the same or different from each other and represent an alkylene selected from the group containing butylene, amylene, octylene or arylene; said arylene being selected from the group containing styrene or methylstyrene; the groups $R_i$ optionally containing one or more hetero atoms;

Q is a hydrocarbon group containing from 2 to 18 carbon atoms and optionally one or more hetero atoms;

A is an alkylidene group containing from 1 to 3 inclusive carbon atoms;

the groups $R_j$ are the same or different from each other and are selected from the group consisting of i) the group A—PO₃H₂, wherein A is as defined hereinabove, ii) and the group

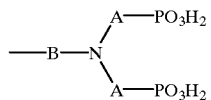

wherein B is an alkylene group containing from 2 to 8 carbon atoms, and A is as defined above;

n is an integral number between 20 and 250;

r is a number of (R—O(Ri—O)ₙ) groups carried by $R_j$;

q is a number of (R—O(Ri—O)ₙ) groups carried by Q;

the sum (r+q) is at most equal to 3; and

"y" is an integral number equal to 1 or 2;

and wherein fluidity of the self-leveling composition before pouring is such that, when a sample of the composition is poured into a reference cone having a minor diameter of 55 mm, a major diameter at the bottom of 95 mm, a height of 70 mm, and then the filled cone is removed, a circular free spreading is obtained to a diameter of at least 15 cm; and b) a support.

30. The fluid floor screed of claim 29, wherein said support is a site of deposit.

31. The fluid floor screed of claim 30, wherein said support is concrete.

32. A hardened floor screed manufactured from a self-leveling composition, which comprises:

a) a self-leveling composition which has been poured onto a support and hardened, said self-leveling composition, comprising:

Portland cement (CEM I) or composite cement (CEM II or CEM III), sand, water, at least one plasticizer (I) and at least fine mineral aggregates having dimensions note exceeding 200 μm, wherein:

a) a quantity of fine particles of dimensions not exceeding 100 μm present in the said self-leveling composition, brought by cement and fine mineral aggregates, is at least equal or greater than 500 kg per m³ of said composition;

b) a water-to-cement ratio (W/C) is equal or greater than 0.6;

c) the plasticizer (I) is a water-soluble or water-dispersible organic compound containing at least one aminodi(alkylenephosphonic) group and at least one polyoxyalkyl chain, or at least one salt of the said compound, the compound having the following formula:

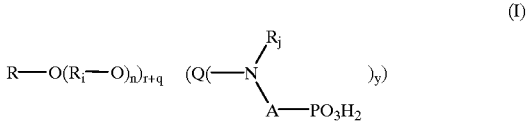

wherein:

R is a hydrogen atom or a monovalent hydrocarbon group, containing from 1 to 18 carbon atoms and optionally one or more hetero atoms;

50% to 100% of the groups $R_i$ are ethylene, 0 to 50% of the groups $R_i$ are propylene and 0 to 5% of any other groups $R_i$ are the same or different from each other and represent an alkylene selected from the group containing butylene, amylene, octylene or arylene; said arylene being selected from the group containing styrene or methylstyrene; the groups $R_i$ optionally containing one or more hetero atoms;

Q is a hydrocarbon group containing from 2 to 18 carbon atoms and optionally one or more hetero atoms;

A is an alkylidene group containing from 1 to 3 inclusive carbon atoms;

the groups $R_j$ are the same or different from each other and are selected from the group consisting of i) the group A—PO3H$_2$, wherein A is as defined hereinabove, ii) and the group

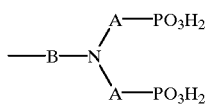

wherein B is an alkylene group containing from 2 to 8 carbon atoms, and A is as defined above, hereinabove, n is an integral number between 20 and 250;

r is a number of (R—O(Ri—O)n) groups carried by $R_j$;

q is a number of (R—O(Ri—O)n) groups carried by Q;

the sum (r+q) is at most equal to 3; and y is an integral number equal to 1 or 2;

and wherein the fluidity of the self-leveling composition before pouring is such that, when a sample of this composition is poured into a reference cone having a minor diameter of 55 mm, a major diameter at the bottom of 95 mm, a height of 70 mm, and then the filled cone is removed, a circular free spreading is obtained to a diameter of at least 15 cm.

33. A process for manufacturing a floor screed on a support, comprising the steps of:

a) preparing the self-leveling composition of claim 1;

b) optionally transporting the composition to a site for deposition;

c) preparing a topping support;

d) optionally adjusting rheology of the composition by adding a supplemental amount of the plasticizer (I), or by adding water thereto; and e) pumping and pouring the composition onto the support and optionally finishing the surface.

34. The process of claim 33, which further comprises allowing said pumped and poured composition to dry on said support.

35. The process of claim 33, wherein said pumped and poured composition remains fluid for up to 4 hours.

36. The process of claim 33, wherein said pumped and poured composition covers at least 800 m$^2$ per day.

37. The process of claim 33, wherein said dried floor screed does not require sanding.

38. The process of claim 33, wherein said finishing in step e) comprises passing a finishing bar over the surface of said composition after pouring the composition over the support.

* * * * *